United States Patent [19]
Schneider

[11] Patent Number: 5,819,789
[45] Date of Patent: Oct. 13, 1998

[54] WATER VALVE FOR A SANITARY FITTING

[75] Inventor: Hermann-Josef Schneider, Schweich, Germany

[73] Assignee: American Standard Inc., Piscataway, N.J.

[21] Appl. No.: 706,110

[22] Filed: Aug. 30, 1996

[30] Foreign Application Priority Data

Sep. 14, 1995 [AT] Austria .................................. A1527/95

[51] Int. Cl.⁶ .................................................. F16K 25/00
[52] U.S. Cl. .............................. 137/454.5; 137/625.31; 251/208
[58] Field of Search .................... 137/454.5, 625.31; 251/127, 208

[56] References Cited

U.S. PATENT DOCUMENTS

| | | | |
|---|---|---|---|
| 3,780,758 | 12/1973 | DeVries | 137/454.6 |
| 4,567,915 | 2/1986 | Bates et al. | 251/127 |
| 4,693,450 | 9/1987 | Paetzel | 251/127 |
| 5,010,917 | 4/1991 | Iqbal | 137/454.6 |
| 5,088,688 | 2/1992 | Kanpp | 137/454.5 |
| 5,524,863 | 6/1996 | Davis | 251/127 |

FOREIGN PATENT DOCUMENTS 3619499  6/1986  Germany .............. 137/454.5

*Primary Examiner*—Denise L. Ferensic
*Assistant Examiner*—Joanne Y. Kim

[57] ABSTRACT

A water valve for a sanitary fitting having a valve body containing a metal half, preferably made of brass, which contains a bearing arrangement for a spindle and a plastic half which contains two ceramic packing discs and a driving element, an inlet seal packing opposite one of the ceramic packing discs and water outlet holes. The plastic half is latched into position with the metal half whereby the metal half has a threaded surface on the lower rim of its external surface when assembled.

8 Claims, 1 Drawing Sheet

U.S. Patent
Oct. 13, 1998
5,819,789
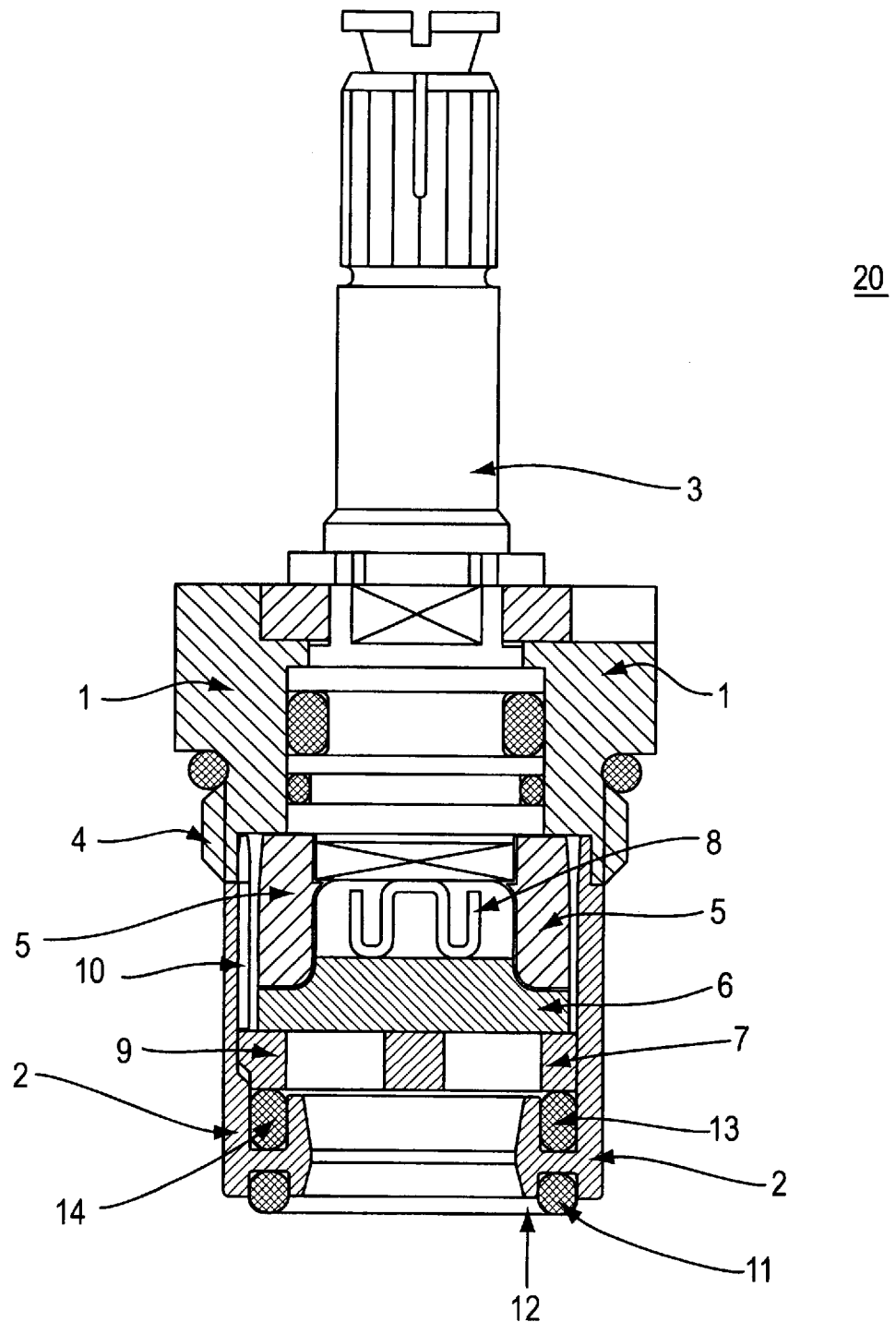

WATER VALVE FOR A SANITARY FITTING

BACKGROUND OF THE INVENTION

The present invention is directed to a water valve for a sanitary fitting and more particularly to a water valve having ceramic packing discs. The water valve is a single unit having threading on its exterior enabling it to be fixed into position to a faucet body.

In existing water valves, the valve body is typically fabricated of metal, such as brass, or of plastic. Metal bodies are sturdy and the external threading provides a reliable and lasting support but the assembly unit, which includes the water valve component is considerably heavy and costly to manufacture. By contrast, the advantage of a synthetic body is that the assembly unit is light and cheap; the disadvantage is that it cannot withstand the mechanical stresses which the assembly unit is subjected to over a lengthy period of time. For example, a valve spindle assembled in a valve body is bound to show signs of wear after a period of time if it is made of plastic. The same applies to the threading on the outer surface of the body, which ceases to provide the necessary support after a length of time. There is also the danger that the external threading on the plastic body may become damaged even before it is screwed into the assembly location.

It is therefore desirable to create a water valve which is cost effective to manufacture, light in weight, stable and reliable and which can be fitted securely and permanently to a faucet body.

It is therefore an object of the invention to construct a sanitary fitting having a valve body containing a metal half (preferably of brass), which contains a bearing arrangement for a spindle, and a plastic half, which contains two ceramic packing discs, a driving element, an inlet seal, a seal opposite one of the ceramic packing discs and water outlet holes whereby the plastic half is latched into position in the metal half. The metal half has a screw threading on the lower rim of its outer surface when fitted to the plastic half for assembly to a faucet body.

Two valve body components which cause great mechanical stress are the bearing arrangement for the spindle and the threading region which connects to the faucet body. These components are located in the sturdy metal half of the structure of the valve body according to the invention. The part of the valve body which is less subject to mechanical stress and is positioned underneath the sink or counter when mounted is made of plastic so that both the overall weight and the manufacturing cost of the assembly unit are lower than those of an assembly unit whose valve body is made entirely of metal. Nevertheless, the water valve according to the invention is of equal or better quality compared to a water valve having a body fabricated entirely of metal.

It is preferable to spray one or more seals onto the plastic half. Spraying allows the packing material to be bonded to the synthetic material of the plastic half of the valve body easily and solidly. In order to be able to spray sealing material onto a metal surface, the metal surface must be specially treated, which is uneconomical in view of the time and costs involved. The process of spraying seals onto a plastic surface obviates the complicated assembly stage of inserting separate seals into the valve assembly. It is advisable to allow an expansion gap in the plastic section for each seal which is sprayed in order to allow its shape to set.

The plastic half is suitable for accommodating either a ceramic disc system with an opening angle of 90° or one with an opening angle of 180°. In this way, the valve can be opened completely either by turning the spindle 90° or 180°. If the plastic half of the valve body can accommodate both systems as options, the same valve body form can be used for both systems and the same tools can be used to manufacture the plastic half for both systems.

The plastic half is practically immobile in relation to the metal half when dismounted. During storage and handling before assembly of the valve to a sink or counter opening, there can be no relative movement between the metal half and the plastic half and therefore the connection between the two halves will not become loosened, detached or worn.

The plastic half is connected to the metal half by means of latching lugs and locking lugs, whereby the two halves are arranged correctly in relation to each other and secured against twisting.

BRIEF DESCRIPTION OF THE DRAWING

The invention will be more fully appreciated from the following detailed description when the same is considered in connection with the accompanying drawing which shows a longitudinal cross-sectional view of a water valve in accordance with the claimed invention.

DETAILED DESCRIPTION OF THE INVENTION

The sole illustration depicts a valve body (20) which consists of a metal half (1) preferably fabricated of brass, and a plastic half (2). A spindle (3) is inserted through metal half (1) of the valve body which serves as a stable, lasting bearing for spindle (3). At the lower end of metal half (1) is an external screw threading (4) which is resistant to damage and wear and which serves to fix the water valve into the assembly location. Spindle (3) has extensions (5) which serve as driving elements for a movable packing disc (6) and project into recesses on its surface.

Extensions (5) extend far into plastic half (2), which, in addition to upper, mobile packing disc (6), also contains a lower, stationary packing disc (7) and a sound absorber (8). The lower packing disc (7) has a lug (9) on its outer periphery which latches into a groove (10) in the inner wall of the plastic half (2), thus preventing the lower packing disc (7) from twisting. On the lower end of the plastic half (2) there is an inlet seal (11) which has an expansion gap (12) allocated to it in order to seal the water inlet opening in the body of the water valve. Above the inlet seal (11) there is packing (13) to seal the valve body against the lower packing disc (7). An expansion gap (14) is also provided for this sealing. Both packings (11) and (13) are pushed into the plastic half (2) and as they take shape they can expand into the expansion gaps (12) and (14). The plastic half (2) guides the extensions from the spindle (3) and the upper packing disc (6) as they turn and it holds the lower packing disc (7) whose lug (9) latches into the groove (10) in the inside wall of the plastic half (2). These functions of the plastic half (2) only involve very slight mechanical stress since the ceramic discs (6) and (7) have highly-polished surfaces which practically prevent any frictional forces from existing.

The metal half (1) and the plastic half (2) are connected with each other by means of one or more latching lugs, which align the two halves (1) and (2) in the correct longitudinal position relative to each other, and also by means of one or more locking lugs, which prevent the two halves (1) and (2) from twisting away from their correct relative position.

Such a combination of materials as is used in this invention for the body of the water valve can reduce weight and lower costs without having to dispense with the stability and durability customary in valve bodies made entirely of metal.

Although illustrative embodiments of the present invention have been described herein with reference to the accompanying drawing, it is to be understood that the invention is not limited to this precise embodiment, and that various other changes and modifications may be effected herein by one skilled in the art without departing from the scope or spirit of the invention.

What is claimed is:

1. A water valve for a sanitary fitting comprising:

a valve body having a first section and a second section, said first section fabricated of metal and said second section fabricated of plastic, said first section comprising a bearing element to support a spindle, said spindle supported in said bearing element, said first section including a threaded section on a lower end of an outer surface of said first section for connection to a faucet assembly, said second section having a pair of sealing discs disposed within said second section and coaxially juxtaposed one above the other, a driving element positioned above an upper disc, packing positioned below a lower disc, an inlet seal positioned below said packing, and water outlet slots located on said second section, whereby said first section is connected to said second section by a locking means.

2. The water valve of claim 1 wherein said sealing discs are fabricated of a ceramic material.

3. The water valve of claim 2 wherein said second section includes extension gaps for accommodating said packing and seal.

4. The water valve of claim 3 wherein said second half is suitable for accommodating discs having an opening angle of 90°.

5. The water valve of claim 3 wherein said second half is suitable for accommodating discs having an opening angle of 180°.

6. The water valve of claim 3 wherein said second section is immobile in relation to said first section.

7. The water valve of claim 3 wherein said second section contains a sound absorber therein.

8. The water valve of claim 7 wherein said second half is locked within said first half.

* * * * *